US012353891B2

(12) United States Patent
Wang et al.

(10) Patent No.: US 12,353,891 B2
(45) Date of Patent: Jul. 8, 2025

(54) SYSTEM SHUTDOWN BASED ON TUNED SHUTDOWN INTERVALS

(71) Applicant: INTERNATIONAL BUSINESS MACHINES CORPORATION, Armonk, NY (US)

(72) Inventors: Hui Wang, Beijing (CN); Xiang Yu Xue, Beijing (CN); Mai Zeng, Beijing (CN); Yu Mei Dai, Beijing (CN); Wei Li, Beijing (CN); Peng Hui Jiang, Beijing (CN); Xiao Chen Huang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 18/342,818

(22) Filed: Jun. 28, 2023

(65) Prior Publication Data

US 2025/0004790 A1  Jan. 2, 2025

(51) Int. Cl.
*G06F 9/4401* (2018.01)

(52) U.S. Cl.
CPC ................... *G06F 9/442* (2013.01)

(58) Field of Classification Search
CPC ........................................................ G06F 9/442
See application file for complete search history.

(56) References Cited

U.S. PATENT DOCUMENTS

| 6,230,181 | B1 | 5/2001 | Mitchell et al. |
| 9,830,181 | B2 * | 11/2017 | Chu ..................... G06F 1/3246 |
| 10,346,305 | B2 | 7/2019 | Gschwind et al. |
| 2003/0005273 | A1 * | 1/2003 | Perycz ................ H04L 41/0856 713/1 |
| 2003/0188217 | A1 * | 10/2003 | Spiegel .................... G06F 9/542 714/E11.144 |
| 2006/0048108 | A1 * | 3/2006 | Ushiku ................... G06F 9/485 717/136 |
| 2018/0081693 | A1 * | 3/2018 | Burton .................. G06F 9/4401 |
| 2018/0203718 | A1 * | 7/2018 | Kia ..................... G06F 9/45558 |
| 2023/0091954 | A1 | 3/2023 | Rommel et al. |

FOREIGN PATENT DOCUMENTS

| CN | 112136292 B | 11/2022 |
| CN | 115587006 A | 1/2023 |
| CN | 115718645 A | 2/2023 |

* cited by examiner

*Primary Examiner* — Nimesh G Patel
(74) *Attorney, Agent, or Firm* — Lily Neff, Esq.; Blanche E. Schiller, Esq.; Heslin Rothenberg Farley & Mesiti P.C.

(57) ABSTRACT

Shutdown intervals between nodes of a dependency tree are determined. The dependency tree represents a system to be shut down and the nodes represent system components of the system. The determining the shutdown intervals includes calculating, for a pair of nodes of the dependency tree, a shutdown interval. The calculating is based on a relationship between the pair of nodes. The calculating is repeated for a plurality of pairs of nodes to obtain a plurality of shutdown intervals. The plurality of shutdown intervals is used in a shutdown of the system components. At least one system component represented by at least one node on a higher node level of the dependency tree is to be shut down prior to at least one other system component represented by at least one other node on a lower node level of the dependency tree.

20 Claims, 11 Drawing Sheets

| | ROOT | A | B | C | D | E | F | G | H | I | J |
|---|---|---|---|---|---|---|---|---|---|---|---|
| ROOT | 0 | -2 | -2 | -2 | -2 | -2 | -2 | -2 | -2 | -2 | -2 |
| A | -1 | 0 | -2 | -2 | -2 | -2 | -2 | -2 | -2 | -2 | -2 |
| B | -1 | -2 | 0 | -2 | -2 | -2 | -2 | -2 | -2 | -2 | -2 |
| C | -2 | -1 | -2 | 0 | -2 | -2 | -2 | -2 | -2 | -2 | -2 |
| D | -2 | -1 | -2 | -2 | 0 | -2 | -2 | -2 | -2 | -2 | -2 |
| E | -2 | -2 | -1 | -2 | -2 | 0 | -2 | -2 | -2 | -2 | -2 |
| F | -2 | -2 | -1 | -2 | -2 | -2 | 0 | -2 | -2 | -2 | -2 |
| G | -2 | -2 | -2 | -1 | -2 | -2 | -2 | 0 | -2 | -2 | -2 |
| H | -2 | -2 | -2 | -2 | -1 | -2 | -2 | -2 | 0 | -2 | -2 |
| I | -2 | -2 | -2 | -2 | -2 | -2 | -1 | -2 | -2 | 0 | -2 |
| J | -2 | -2 | -2 | -2 | -2 | -2 | -2 | -1 | -2 | -2 | 0 |

| | ROOT | A | B | C | D | E | F | G | H | I | J |
|---|---|---|---|---|---|---|---|---|---|---|---|
| ROOT | 0 | -2 | -2 | -2 | -2 | -2 | -2 | -2 | -2 | -2 | -2 |
| A | -1 | 0 | -2 | -2 | -2 | -2 | -2 | -2 | -2 | -2 | -2 |
| B | -1 | -2 | 0 | -2 | -2 | -2 | -2 | -2 | -2 | -2 | -2 |
| C | -2 | -1 | -2 | 0 | -2 | -2 | -2 | -2 | -2 | -2 | -2 |
| D | -2 | -1 | -2 | -2 | 0 | -2 | -2 | -2 | -2 | -2 | -2 |
| E | -2 | -2 | -1 | -2 | -2 | 0 | -2 | -2 | -2 | -2 | -2 |
| F | -2 | -2 | -1 | -2 | -2 | -2 | 0 | -2 | -2 | -2 | -2 |
| G | -2 | -2 | -2 | -1 | -2 | -2 | -2 | 0 | -2 | -2 | -2 |
| H | -2 | -2 | -2 | -2 | $max(T_{eH}, T_{H\text{-}aver})$ | -2 | -2 | -2 | 0 | -2 | -2 |
| I | -2 | -2 | -2 | -2 | -2 | -2 | $max(T_{eI}, T_{I\text{-}aver})$ | -2 | -2 | 0 | -2 |
| J | -2 | -2 | -2 | -2 | -2 | -2 | -2 | $max(T_{eJ}, T_{J\text{-}aver})$ | -2 | -2 | 0 |

FIG. 8

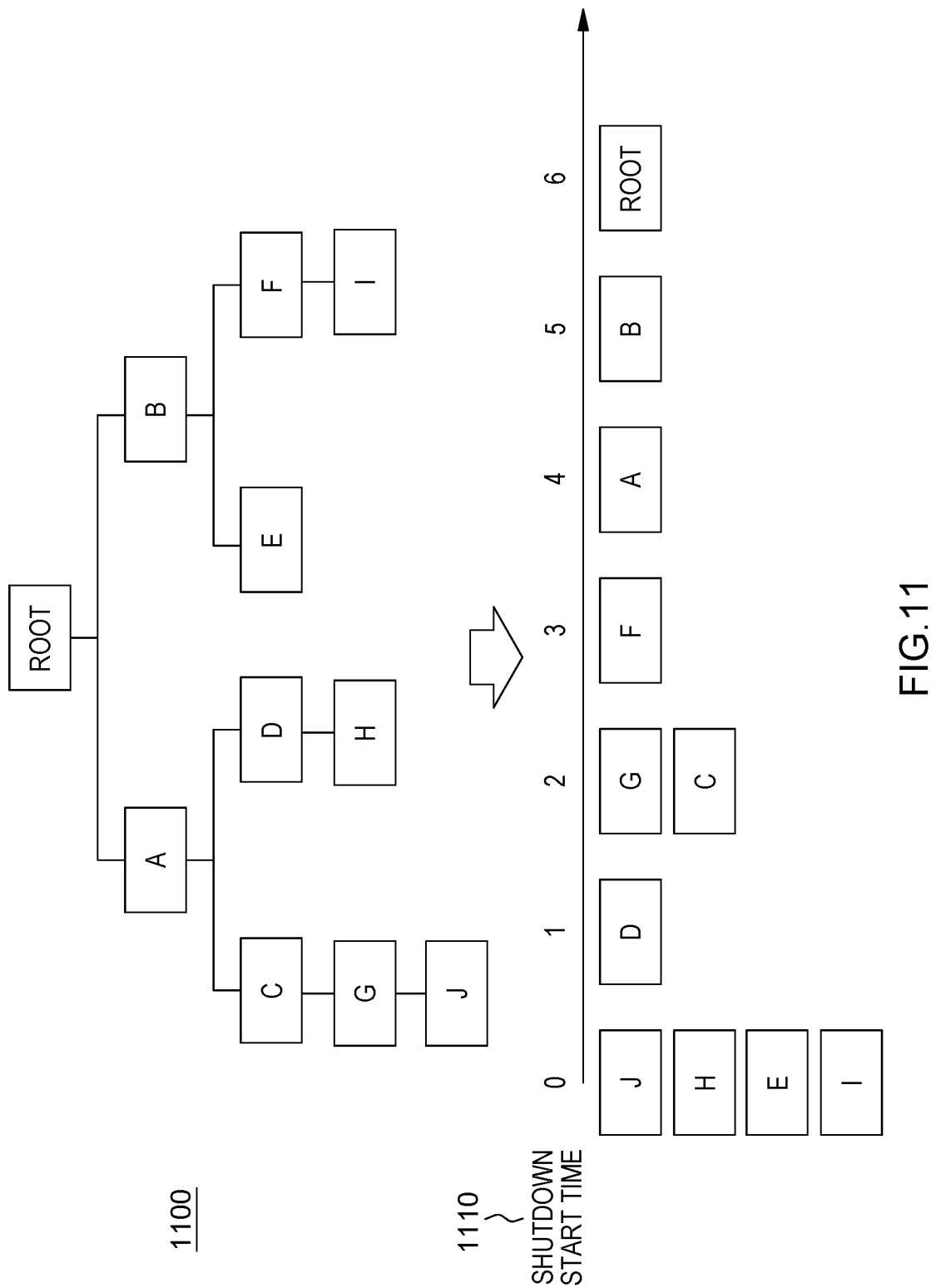

SYSTEM SHUTDOWN BASED ON TUNED SHUTDOWN INTERVALS

BACKGROUND

One or more aspects relate, in general, to facilitating processing within a computing environment, and in particular, to facilitating shutdown/restart processing within the computing environment.

System restart is a common information technology maintenance operation used to add services to a system of the computing environment and/or to correct system issues. A system may include multiple subsystems and components.

As part of a system restart, system shutdown is performed. During system shutdown, there are situations that can cause delays, including some subsystems depend on others and have predefined dependencies, causing them to be shut down in a particular sequence; some subsystems are to wait for other subsystems to fully shut down; and due to the complexity and dependency of subsystems, an automation tool may be used to shut down the system, in which the shutdown sequence and commands are defined in advance in an automation policy based on a subsystem or component owners' understanding and previous experience. One or more of these situations may, at times, block the shutdown process and cause forced shutdowns.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining shutdown intervals between nodes of a dependency tree. The dependency tree represents a system to be shut down and the nodes represent system components of the system. The dependency tree includes a plurality of node levels. The determining the shutdown intervals includes calculating, for a pair of nodes of the dependency tree, a shutdown interval for the pair of nodes. The calculating is based on a relationship between the pair of nodes. The calculating is repeated for a plurality of pairs of nodes of the dependency tree to obtain a plurality of shutdown intervals. The plurality of shutdown intervals is used in a shutdown of the system components. At least one system component represented by at least one node on a higher node level of the dependency tree, relative to another level of the dependency tree that is a lower node level of the dependency tree, is to be shut down prior to at least one other system component represented by at least one other node on the lower node level of the dependency tree.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 7 depicts one example of an interval matrix used in accordance with one or more aspects of the present invention;

FIG. 8 depicts one example of the interval matrix of FIG. 7 adjusted in accordance with one or more aspects of the present invention;

FIG. 11 depicts one example of a shutdown sequence determined in accordance with one or more aspects of the present invention.

DETAILED DESCRIPTION

Figure 1:
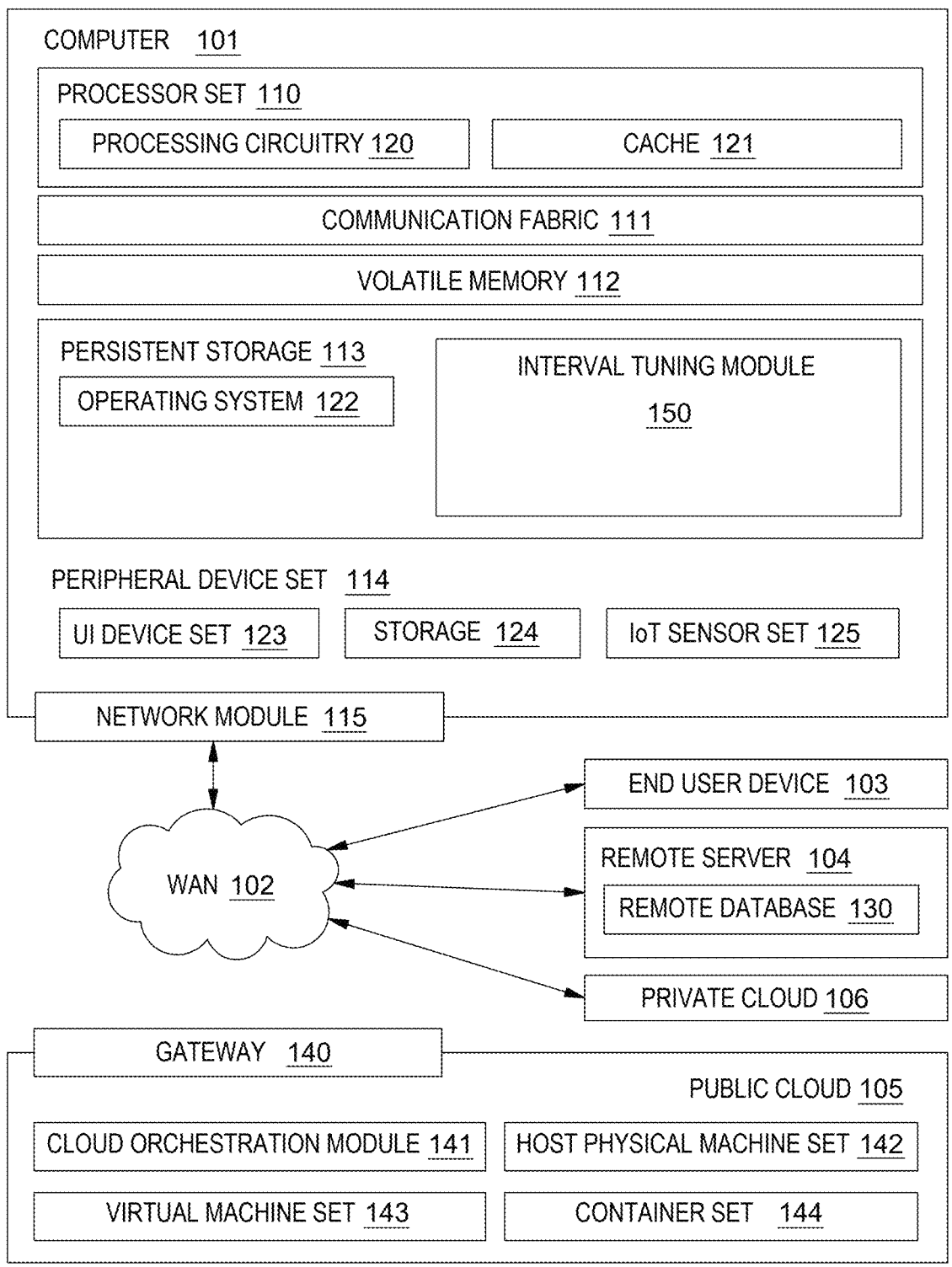
FIG. 1 depicts one example of a computing environment to incorporate, perform and/or use one or more aspects of the present invention.

In accordance with one or more aspects, a capability is provided to facilitate processing within a computing environment. In one or more aspects, the capability includes facilitating shutdown and restart processing of a system (e.g., an operating system or other system) within the computing environment. The system is represented, in one or more examples, by a dependency tree in which nodes of the tree represent system components of the system (e.g., access techniques, database systems, applications, workloads, etc.). In one or more aspects, shutdown intervals between nodes of the dependency tree are tuned to provide a shutdown policy of the system. The shutdown policy accelerates shutdown of one or more system components, reducing system shutdown time, and therefore, reducing the time to restart the system.

In accordance with one or more aspects, shutdown intervals between selected nodes, such as parent nodes and child nodes of the dependency tree, are tuned to enable certain system components to shutdown prior to other system components. For instance, certain parent nodes (i.e., system components represented by the parent nodes) may be shut down prior to one or more of their child nodes or other child nodes in the dependency tree (i.e., system components represented by the child nodes) being fully shut down. That is, instead of shutting down nodes (i.e., system components represented by the nodes) level by level in the dependency tree, selected nodes (i.e., system components represented by the selected nodes) on one level (e.g., a higher level where the root of the tree is the highest level, and the leaves of the tree are the lowest level) are able to be shut down prior to one or more nodes (i.e., system components represented by the nodes) on a lower level. By tuning the intervals between selected nodes, such as one or more parent and child nodes, the shutdown time is tuned (e.g., adjusted) to facilitate system shutdown (e.g., reducing system shutdown time, thereby reducing restart time of the system).

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs interval tuning and/or one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as interval tuning code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Moreover, in one or more embodiments, one or more of the components/modules may be used to provide functions in addition to and/or different than described above. Other variations are possible.

Figure 2A:
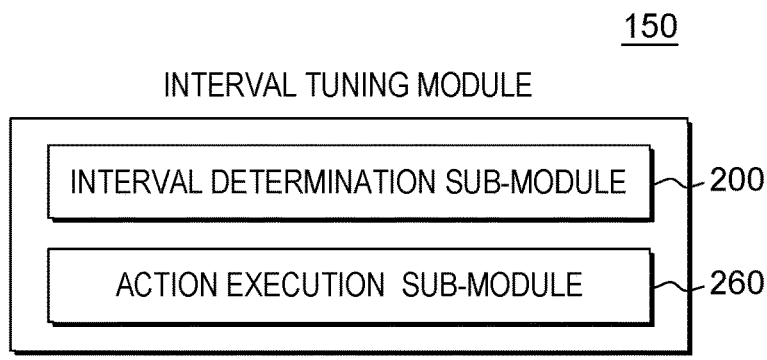
FIG. 2A depicts one example of an interval tuning module, in accordance with one or more aspects of the present invention.

In one or more aspects, referring to FIG. 2A, an interval tuning module (e.g., interval tuning module 150) includes, in one example, various sub-modules to be used to tune shutdown intervals and/or to perform tasks relating thereto. The sub-modules are, e.g., computer readable program code (e.g., instructions) in computer readable media, e.g., storage (persistent storage 113, cache 121, storage 124, other storage, as examples). Although, as an example, interval tuning module 150 is depicted in FIG. 1 in persistent storage 113, one or more sub-modules may be in other storage, etc. Many variations are possible.

The computer readable media may be part of one or more computer program products and the computer readable program code may be executed by and/or using one or more computing devices (e.g., one or more computers, such as computer(s) 101; one or more servers, such as remote server(s) 104; one or more devices, such as end user device(s) 103; one or more processors or nodes, such as processor(s) or node(s) of processor set 110; processing circuitry, such as processing circuitry 120 of processor set 110 and/or other computing devices, etc.). Additional and/or other computers, servers, devices, processors, nodes, processing circuitry and/or computing devices may be used to execute one or more of the sub-modules and/or portions thereof. Many examples are possible.

Example sub-modules of interval tuning module 150 include, for instance, an interval determination sub-module 200 to, e.g., determine shutdown intervals between nodes of a dependency tree representing a system and/or to adjust such intervals; and an action execution sub-module 260 to perform one or more actions related to shutdown interval tuning, including a shutdown of the system. Additional, fewer and/or other sub-modules may be used to perform interval tuning and/or related tasks. Other variations are possible. Although various sub-modules are described, an interval tuning module, such as interval tuning module 150, may include additional, fewer and/or different sub-modules. A particular sub-module may include additional code, including code of other sub-modules, less code, and/or different code. Further, additional and/or other modules may be used to tune shutdown intervals and/or perform related tasks. Many variations are possible.

Further details related to interval tuning module 150 are described with reference to FIGS. 2B-2C. For instance, further details related to interval determination sub-module 200 are described with reference to FIG. 2B and further details related to action execution sub-module 260 are described with reference to FIG. 2C.

Figure 2B:
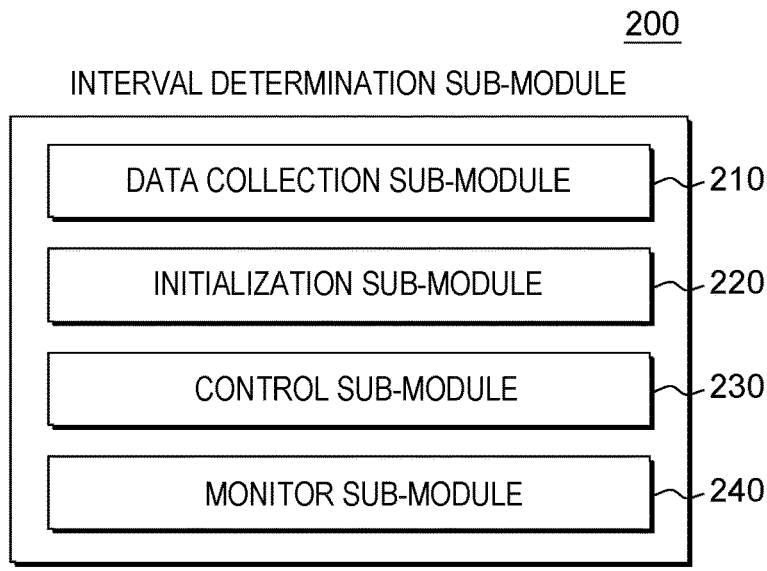
FIG. 2B depicts one example of sub-modules of an interval determination sub-module of the interval tuning module of FIG. 2A, in accordance with one or more aspects of the present invention.

Referring to FIG. 2B, interval determination sub-module 200 includes, for instance, a data collection sub-module 210 to collect historical shutdown time data for each system component represented by a node in a dependency tree; an initialization sub-module 220 to initialize and refine an interval matrix and node sets used in iteratively tuning the shutdown intervals; a control sub-module 230 to iteratively tune one or more shutdown intervals based on, e.g., node shutdown status and to update the interval matrix; and a monitor sub-module 240 to obtain force shutdown status information from a shutdown sub-module. Although various sub-modules are described, an interval determination sub-module, such as interval determination sub-module 200, may include additional, fewer and/or different sub-modules. A particular sub-module may include additional code, including code of other sub-modules, less code, and/or different code. Many variations are possible.

Figure 2C:
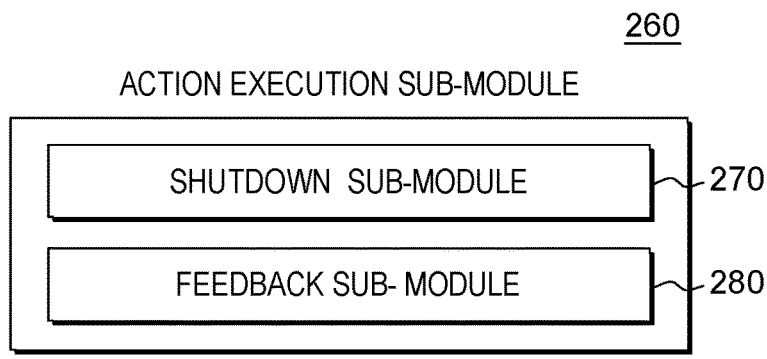
FIG. 2C depicts one example of sub-modules of an action execution sub-module of the interval tuning module of FIG. 2A, in accordance with one or more aspects of the present invention.

Referring to FIG. 2C, action execution sub-module 260 includes, for instance, a shutdown sub-module 270 to perform shutdown of system components, represented by nodes of the dependency tree, according to the interval matrix; and a feedback sub-module 280 to obtain feedback to be used to tune the shutdown intervals. Although various sub-modules are described, an action execution sub-module, such as action execution sub-module 260, may include additional, fewer and/or different sub-modules. A particular sub-module may include additional code, including code of other sub-modules, less code, and/or different code. Many variations are possible.

Figure 3:
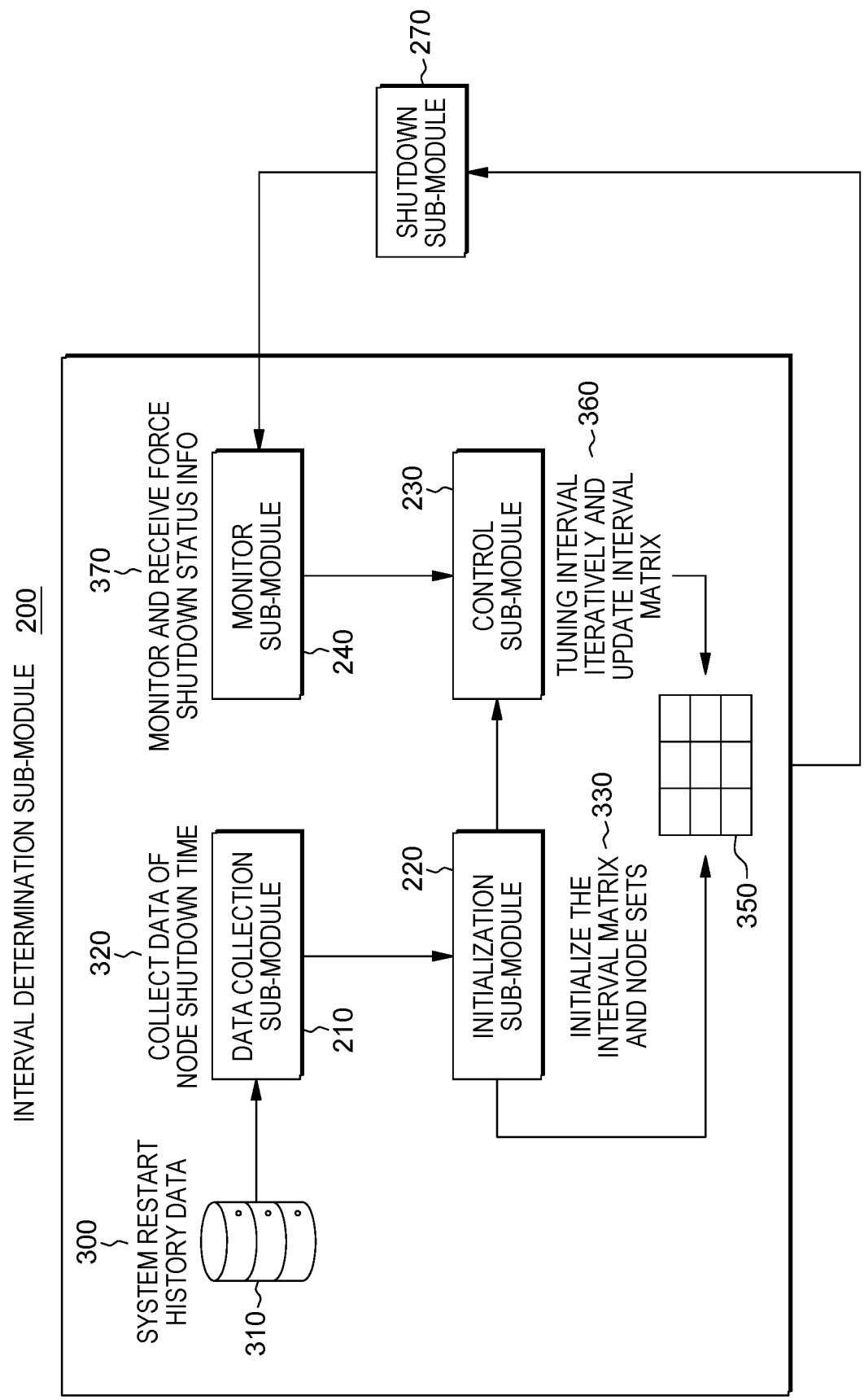
FIG. 3 depicts one example of further details of the sub-modules of the interval tuning module of FIG. 2A, in accordance with one or more aspects of the present invention.

One example of interactions between various sub-modules of FIGS. 2B-2C is described with reference to FIG. 3. As shown, in one example, system restart history data 300 stored in one or more databases 310 is input to a data collection sub-module (e.g., data collection sub-module 210 of interval determination sub-module 200), which collects 320 data related to shutdown times of system components. The collected data is passed, in one example, to an initialization sub-module (e.g., initialization sub-module 220), which initializes 330 an interval matrix (e.g., interval matrix 350) and one or more node sets. The initialized interval matrix (e.g., interval matrix 350) and the one or more node sets are provided to a control module (e.g., control module 230) that iteratively tunes 360 the intervals and updates the interval matrix.

In one or more aspects, control module 230 further receives input from a monitor sub-module (e.g., monitor sub-module 240), which monitors 370, e.g., shutdown status of system components and receives forced shutdown status information from a shutdown sub-module (e.g., shutdown sub-module 270 of action execution sub-module 260). Shutdown sub-module 270 obtains input from an interval determination sub-module (e.g., interval determination sub-module 200) and uses that input (e.g., interval matrix) to shut down the system (e.g., system components of the system). The system components may be, for instance, infrastructure, middleware, subsystems and/or workloads, etc. of the system (e.g., an operating system or other system). Example system components include, for instance, access techniques, database systems, applications, workloads, etc. and/or any other system components of the system.

Figure 4:
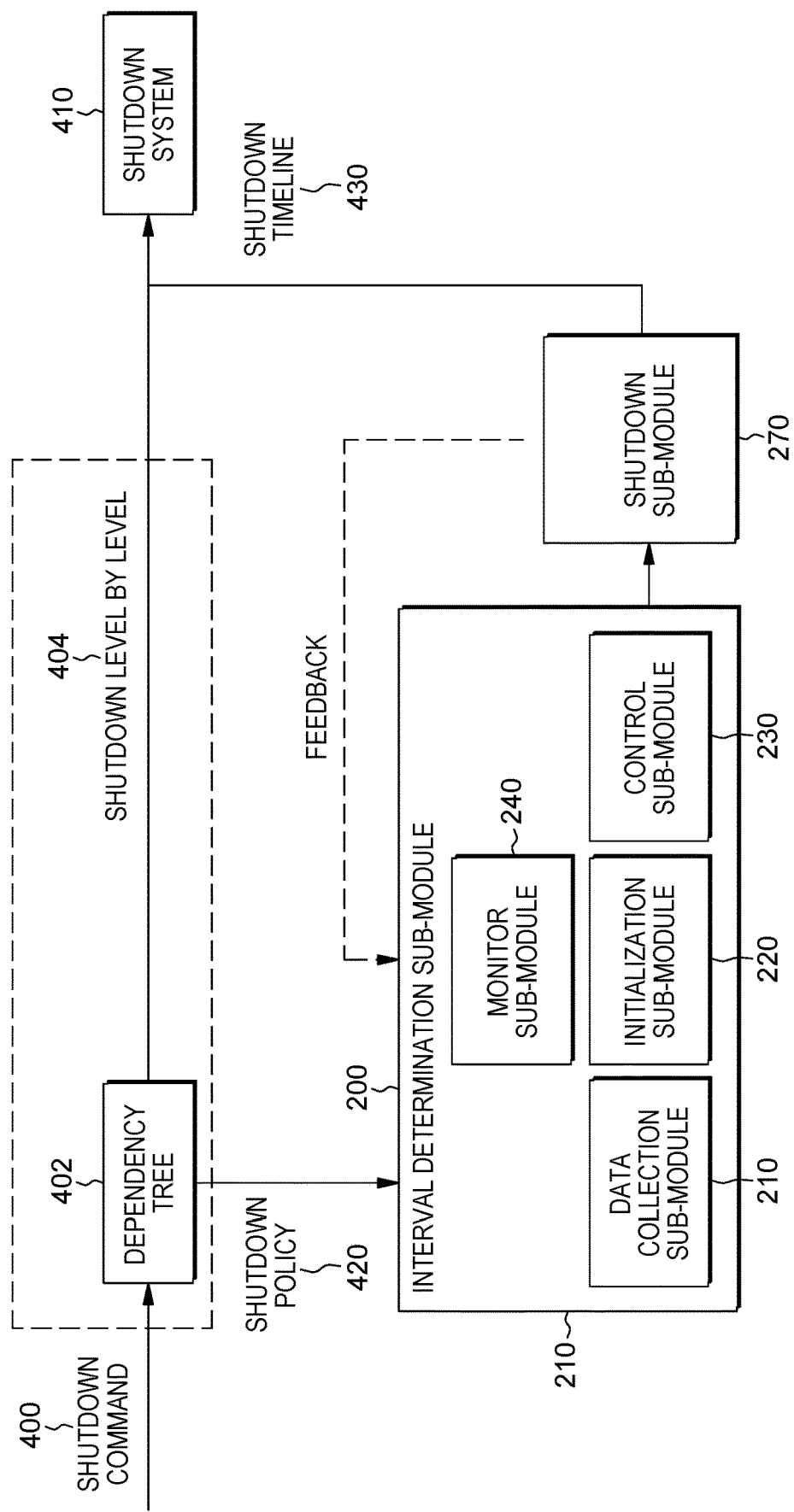
FIG. 4 depicts one example of using the sub-modules of the interval tuning module of FIG. 2A, in accordance with one or more aspects of the present invention.

One example of further details of using the sub-modules is described with reference to FIG. 4. In one example, a shutdown command 400 is issued for a system (e.g., an operating system or other system) represented by a dependency tree 402. The dependency tree includes a plurality of nodes, and each node represents a system component of the system to be shut down and dependencies between them.

In one shutdown approach, shutdown is performed 404, by a shutdown system (e.g., shutdown system 410), level by level, starting, for instance, at the lowest level of the dependency tree (e.g., at the leaf level) up to the highest level (e.g., root level) of the dependency tree. At the conclusion of the shutdown of the system components represented by the nodes at the highest level, the system is shutdown. The level by level shutdown is performed one level at a time, which may increase the shutdown time.

However, in accordance with one or more aspects of the present invention, shutdown is facilitated by taking a different approach to shutdown than a level by level approach. In this approach, based on obtaining shutdown command 400 for a dependency tree (e.g., dependency tree 402), a shutdown policy 420 is generated using an interval determination sub-module (e.g., interval determination sub-module 200). Interval determination sub-module, including data collection sub-module 210, initialization sub-module 220 and control sub-module 230, is used to provide a shutdown policy to a shutdown sub-module (e.g., shutdown sub-module 270) that provides a shutdown timeline 430 to a shutdown system (e.g., shutdown system 410). The shutdown system shuts down the system components, based on the shutdown timeline/shutdown policy. This shutdown approach does not rely on a level by level approach, but instead, is based on paths within the dependency tree, in which a path is from a leaf node of the dependency tree to a root node of the dependency tree. In this approach, a system component corresponding to a node on one level, such as a higher level of the dependency tree, may be shut down prior to at least one system component corresponding to at least one node on another level, such as a lower level of the dependency tree. This reduces the time to perform system shutdown, enabling a restart of the system to be performed sooner than with a level by level approach.

In one or more aspects, shutdown sub-module 270 provides feedback to a monitor sub-module (e.g., monitor sub-module 240) enabling optimizations to be made in the timeline. In particular, shutdown intervals between nodes on different levels are tuned to reduce shutdown processing time.

One or more of the sub-modules are used, in accordance with one or more aspects of the present invention, to perform shutdown interval tuning and/or other tasks related thereto, as further described with reference to FIG. 5. In one example, an interval tuning process (e.g., an interval tuning process 500) is implemented using one or more of the sub-modules (e.g., sub-modules 200, 210-240) and is executed by one or more computing devices (e.g., computer(s) (e.g., computer(s) 101, other computer(s), etc.), server(s) (e.g., server(s) 104, other server(s), etc.), processor(s), node(s) and/or processing circuitry, etc. (e.g., of processor set 110 or other processor sets), and/or one or more other computing devices, etc.). Although example computers, servers, processors, nodes, processing circuitry and/or computing devices are provided, additional, fewer and/or other computers, servers, processors, nodes, processing circuitry, and/or other computing devices may be used for the interval tuning process and/or other processing. Various options are possible.

Figure 5:
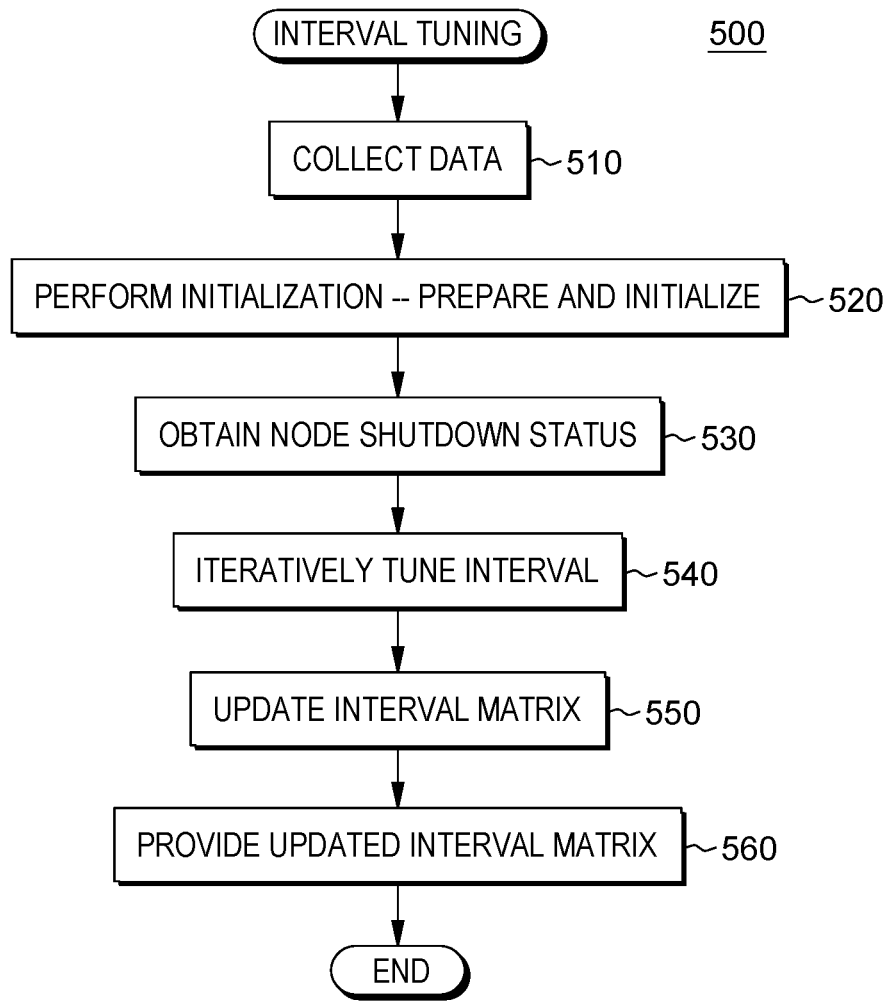
FIG. 5 depicts one example of an interval tuning process, in accordance with one or more aspects of the present invention.

In one example, referring to FIG. 5, interval tuning process 500 (also referred to herein as process 500) collects 510 data, including historical shutdown time data for each system component represented by a node in the dependency tree. This information is obtained, for instance, from one or more databases, such as database 310. Based on the collected data, interval tuning process 500 performs initialization 520 to, e.g., initialize and refine an interval matrix (e.g., interval matrix 350) and one or more node sets. The performing initialization includes, for instance, a prepare action to define a structure for each node of the dependency tree and an initialize action to find the leaf nodes as the start to shut down for each path within the dependency tree. Further details relating to the prepare action are described below.

In one example, to define an interval matrix and a set of nodes, matrix M, T and/are defined. Each system component is considered a node and the node meta data (also referred to as structure) is defined as, for instance:

$$(I,\{P\},\{C\})$$

where:
I—The interval time between the child node shutdown started and the shutdown command issued for this node.
{P}—The parent's node set. For the root node, {P}∈∅.
{C}—The children's nodes set. For the leaf node, {C}∈∅.

Let M be the interval matrix which is to be tuned (e.g., adjusted). The X axis is the parent node, and the Y axis is the child node. For interval N(i, j) means there is a direct relationship (e.g., a dependency relationship) between i (e.g., parent node) and j (e.g., child node), j is to shutdown first before i shuts down. For interval N(i, i) in diagonal line of a matrix, the value is to be $$\max_{a \in \{c_N\}} I_{aN},$$

where a belongs to a set of child nodes and I is the interval between the child node a and itself. For node n, $T_{sn}$ is shutdown start time, $T_{en}$ is shutdown end time.

An initialized interval (I) iteration starts from the leaf node:

For leaf node l, $I_l=0$
For the common node n and its parent node p, $I_{pn}=T_{en}-T_{sn}$.

In one example, each leaf node is set with a shutdown start time, which is the time the system shutdown instruction issued, and the shutdown start time for each parent node p is to be $$T_{sp} = \max_{a \in \{c_n\}} (T_{sa} + I_{pn}),$$

where $T_{sa}$ is the start time of node a and $I_{pn}$ is the interval between the node and the parent.

In one example, each pair of nodes (also referred to as node pair; e.g., any two nodes of the dependency tree, such as a parent/child, two siblings, nodes on different levels of the dependency tree with no dependency, etc.) is set with a shutdown start interval within −2, −1 or 0~T, where:
−2—there is no direct relationship between two nodes.
−1—waiting for child node shutdown end.
0—Shutdown immediately once the child nodes start to shut down.

In one example, a shutdown rule is defined that includes, e.g., a shutdown start time, $T_s$, and a parent/child shutdown interval (and/or other pairs of nodes) that is based on a hierarchy of nodes. For example, referring to FIG. 6, a hierarchy of nodes 600 (also referred to as a dependency tree or tree, as examples) includes a root node 610, which has two child nodes 620, 622. Child node 620 has two child nodes 630, 632; and child node 622 has two child nodes 634 and 636. Child node 630 has one child node 640, which has a child leaf node 650 (i.e., a last node of a path to the root node of a dependency tree). Child node 632 has one child leaf node 642, and child node 636 has one child leaf node 644. Child node 634 is also a leaf node, in one example.

Figure 6:
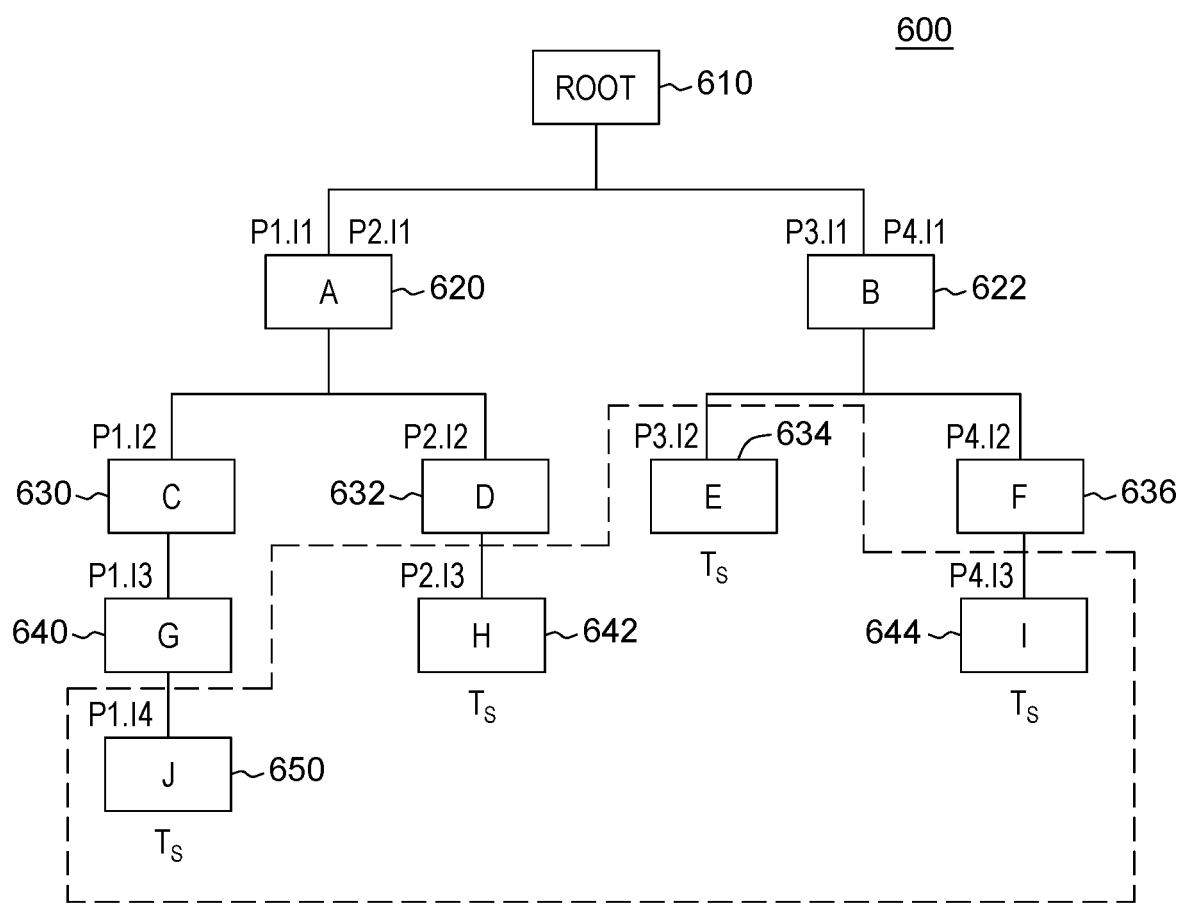
FIG. 6 depicts one example of a dependency tree used in accordance with one or more aspects of the present invention.

As examples, shutdown intervals for the nodes of the dependency tree depicted in FIG. 6 are defined by a path (Pn) from the root node (e.g., root node 610) to a leaf node (e.g., node 650, 642, 634 or 644) and intervals (In) between the nodes in the path from the root node to the leaf node of the path. Each interval represents an interval between a pair of nodes, such as, e.g., a parent node and a child node. For instance, a path 1 is from root node 610 to leaf node 650 (or stated another way from a leaf node to the root node) and includes four intervals (e.g., an interval I1 from root 610 to node 620 (P1.I1); an interval I2 from node 620 to node 630 (P1.I2); an interval I3 from node 630 to node 640 (P1.I3); and an interval I4 from node 640 to node 650 (P1.I4)); a path 2 is from root node 610 to leaf node 642 and includes three intervals (P2.I1, P2.I2, P2.I3); a path 3 is from root node 610 to leaf node 634 and includes two intervals (P3.I1, P3.I2); and a path 4 is from root node 610 to leaf node 644 and includes three intervals (P4.I1, P4.I2, P4.I3). Other examples are possible and dependency trees may include many nodes and dependencies between the nodes. The number of nodes and dependencies described herein is only one example and provided for clarity.

As part of initialization, an interval matrix for the dependency tree is initialized, in which each node pair interval is set to, for instance, a start interval within −2, −1 or 0~T, where: −2 when there is a no direct relationship between two nodes (e.g., siblings, such as node A 620 and node B 622; nodes that are not parent/child, such as root node and any of the nodes other than node A 620 and node B 622, etc.); −1 waiting for child node shutdown end (e.g., for each parent/child); and 0 for shutdown immediately once the child node starts to shut down. One example of such a matrix is described with reference to FIG. 7.

In one example, an interval matrix 700 is initialized for the dependency tree depicted in FIG. 6. As an example, to initialize the interval matrix, the interval between each parent/child node is set to −1, the intervals between other pairs of nodes (other than the pair (i, i)) are set to −2; and the intervals for the pair of nodes (i, i) are set to 0. For instance, since node A is a child of the root node, the interval is set to −1; likewise for node B. Similarly, since node A is the parent of nodes C and D, each of those intervals is set to −1; as well as the intervals for parent node B and child nodes E and F. Each of the intervals for parent node C and child node G, parent node D and child node H, parent node F and child node I, and parent node G and child node J is set to −1. Each interval where the parent node and the child node are the same is set to 0, and all other intervals are set to −2. Other examples are possible.

In one or more aspects, in addition to the prepare action, initialization also includes an initialize action that finds the leaf nodes of the dependency tree as the start to shutdown for each path and tunes intervals associated with the leaf nodes, as described in one example below.

For instance, the adjustment may include the following, in one example:
Collect all leaf nodes/to a set {L} and shutdown all nodes in {L}.
Record interval/between shutdown end $T_{el}$ and start $T_{st}$ and the average time shutdown time $T_{l-aver}$ from history data.
Initialize all $I_{ml}$=max ($T_{el}-T_{sl}$, $T_{l-aver}$) for each m∈{M}, (m∈{$P_i$}, l∈{L}, $C_m$∈{L})
Generate a set {D} to save all nodes which have been adjusted.

Take the following example:
Define leaf node set={J, H, E, I}
Set the $T_{st}$ of leaf nodes to 0.
Shutdown all leaf nodes {J, H, E, I}
Find {M}={G, D, F}
Initialize $I_{GJ}$, $I_{DH}$, $I_{FI}$ An example of the adjusted intervals is shown in FIG. 8. As shown, the interval between the parent D and the child H is adjusted to max ($T_{eH}$, $T_{H\text{-}aver}$); the interval between the parent F and the child I is adjusted to max ($T_{eI}$, $T_{I\text{-}aver}$); and the interval between the parent G and the child J is adjusted to max ($T_{eI}$, $T_{J\text{-}aver}$). Other examples are possible.

The initialized interval matrix is further adjusted based, for instance, on shutdown status of one or more nodes (i.e., one or more system components represented by the one or more nodes). In one or more aspects, the adjustment is performed iteratively to iteratively tune the intervals from the leaf nodes to the root node. One example of iteratively tuning is described below.

Returning to FIG. 5, process 500 obtains 530 node shutdown status and iteratively tunes 540 one or more intervals in the interval matrix. For instance, if there was a forced shutdown of a system component (which is to be avoided as much as possible), this status is obtained by process 500 and process 500 decreases the interval associated with that node by, e.g., a step size. In one example, the tuning is performed iteratively based on status received. As examples, the tuning is performed each time status is received, and/or periodically, based on collected data. Variations are possible.

In one or more aspects, policy adjustment iteration includes, for instance:
  Adjust policy for node set: {M}, (m∈{M}, m∈{$P_l$}, l∈{L}, ∀$C_m$∈{L}), where ∀ indicates for all.
  Start from the existing policy.
    Run & check the shutdown type of all nodes in {M}.
      If all nodes shutdown successfully, reduce $I_{ml}$ by a certain percentage (e.g., any selected percentage (e.g., 10% or any other selected percentage));
      Else if ∃c∈$C_m$ forced shutdown for first reduce, it turns out that m is to shutdown after $C_m$ are completely shutdown, so mark $I_{ml}$=−1, where ∃ indicates there exists.
      Else if m forced shutdown after n times reduce, $I_{ml}$ in (n−1) times is the most proper time.
    Redo the run & check until no force shutdown or $I_{ml}$=0; generate a set {D} to save all nodes which have been adjusted. Move m to {D}.
As an example:
Define node set{M}={G, D, F}
After first reduce $I_{GJ}$, $I_{DH}$, $I_{FI}$,
If H, I forced shutdown, so $I_{DH}$, $I_{FI}$ is to be initial time, stop adjust $I_{DH}$, $I_{FI}$ and mark as −1;
If J shutdown successfully, new $I_{GJ1}$=0.9*$I_{GJ0}$ and continue to adjust $I_{GJ}$ next time.
Reduce $I_{GJ}$ again,
If J shutdown successfully, new $I_{GJ2}$=0.8*$I_{GJ1}$ and continue to adjust $I_{GJ}$ next time.
Reduce $I_{GJ}$ again,
If J forced shutdown, set final $I_{GJ3}$=0.9*$I_{GJ0}$ and stop to adjust $I_{GJ}$.
Additionally, in one example:
Adjust policy for next level node set: {N}, (n∈{N}, n∈{$P_m$}, m∈{D}∪{L}, ∀$C_n$∈{D}∪{L}).
  Start from the existing policy.
    For node n E {N}, Initialize all $I_{nm}$=max($T_{em}$−$T_{sm}$, $T_{m\text{-}aver}$).
    Run & check the shutdown type of all nodes.
      If all nodes shutdown successfully, reduce $I_{nm}$ by a certain percentage.
      Else if ∃c∈$C_n$ forced shutdown for first reduce, it turns out that n is to be shut down after $C_n$ are completely shutdown, so mark $I_{nm}$=−1.
      Else if m forced shutdown after n times reduce, $I_{nm}$ in (n−1) times is the most proper time.
    Redo the run & check until no force shutdown or $I_{nm}$=0, Move n to {D}.
As an example:
Define node set {N}={C, B}
Reduce $I_{BF}$ for 4 times,
If F shutdown successfully, new $I_{BF4}$=0.6*$I_{BF0}$ and continue to adjust $I_{BF}$ next time.
Reduce $I_{BF}$ again,
If F forced shutdown, set final $I_{BF5}$=0.6*$I_{BF0}$ and stop to adjust $I_{BF}$.
Reduce $I_{CG}$ for 10 times,
If G shutdown still successfully, it turns out C can shutdown at same time as G, so set $I_{CG}$=0.

In one or more aspects, the adjust policy steps are redone until all nodes are in {D}∪{L}. Therefore, {D}={B, C, D, F, G} and {L}={J, H, E, I} and now: {D}={G, D, F, C, A, E, B, Root) and {L}={J, H, E, I}.

Further details relating to the iteration process are described with reference to FIG. 9. In one example, an iteration process (e.g., an iteration process 900) is implemented using one or more of the sub-modules (e.g., sub-modules 200, 210-240) and is executed by one or more computing device(s) (e.g., computer(s) (e.g., computer(s) 101, other computer(s), etc.), server(s) (e.g., server(s) 104, other server(s), etc.), processor(s), node(s) and/or processing circuitry, etc. (e.g., of processor set 110 or other processor sets), and/or one or more other computing devices, etc.). Although example computers, servers, processors, nodes, processing circuitry and/or computing devices are provided, additional, fewer and/or other computers, servers, processors, nodes, processing circuitry, and/or other computing devices may be used for the iteration process and/or other processing. Various options are possible.

Figure 9:
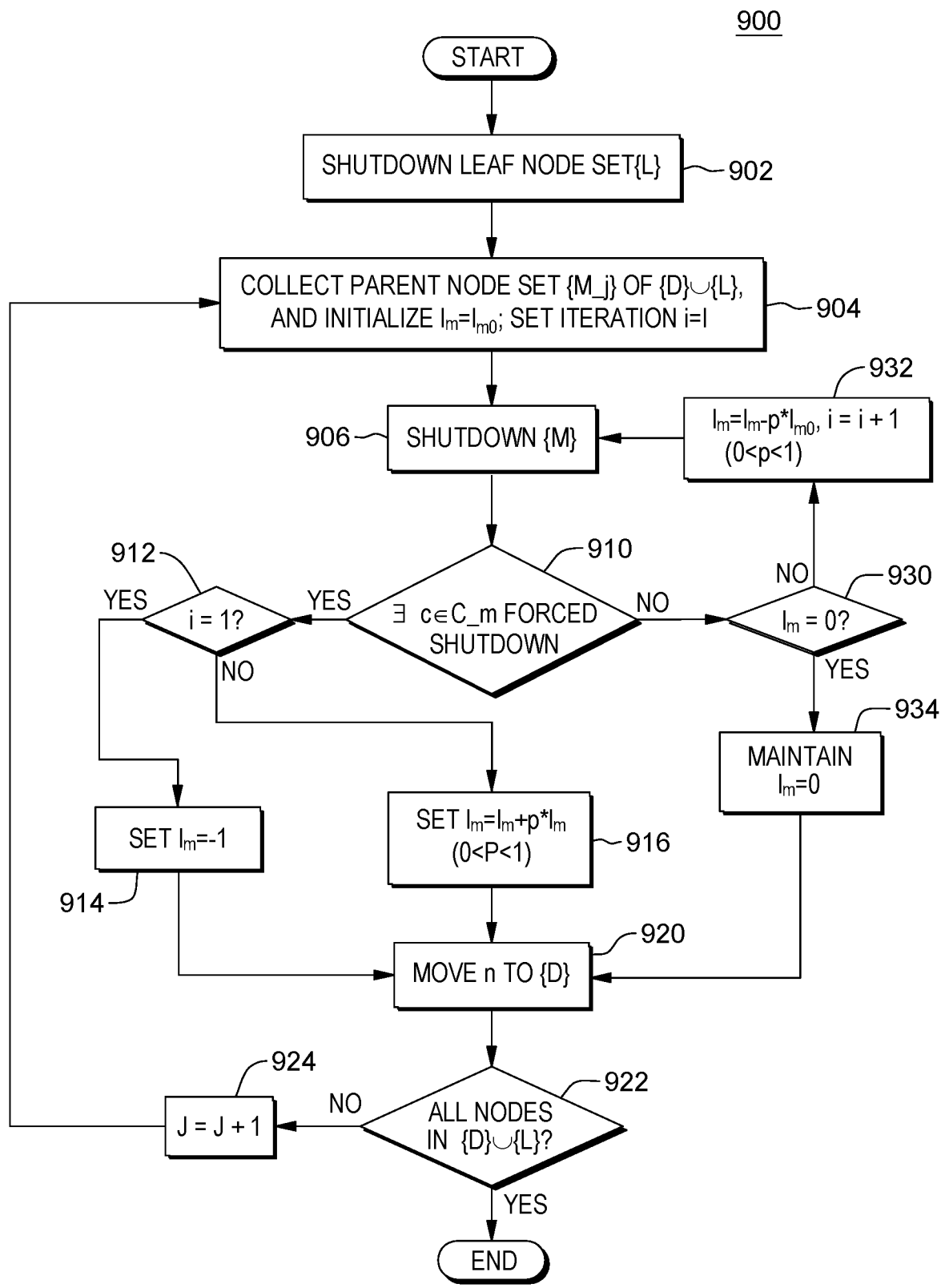
FIG. 9 depicts one example of an iteration process, in accordance with one or more aspects of the present invention.

Referring to FIG. 9, in one example, iteration process 900 (also referred to as process 900) identifies 902 a set of leaf nodes, set (L), to be shut down. Process 900 collects 904 a parent node set (M_j) of {D}∪{L}, initializes $I_m$=$I_{m0}$, and sets iteration i=1. Process 900 shuts down 906 the set of nodes {M}.

Process 900 determines 910 if there was a forced shutdown. For instance, is ∃c∈$C_m$ a forced shutdown? If yes, process 900 determines 912 whether iteration i is set to 1. Should iteration i be set to 1, process 900 sets 914 $I_m$ to a selected value, such as −1. Further, process 900 moves 920 node n to set {D}.

Process 900 determines 922 whether all the nodes are included in {D}∪{L}. If all the nodes are not included in {D}∪{L}, then process 900 increments 924 a variable j (e.g., j=j+1), and processing continues to step 904; otherwise, process 900 ends.

Returning to inquiry 912, if i is not set to 1, then process 900 increments $I_m$ 916, e.g., $I_m$+p*$I_m$, where (0<p<1), and processing continues to step 920.

Returning to inquiry 910, if there is not a forced shutdown, then process 900 determines 930 whether $I_m$ is equal to a selected value, e.g., 0. If $I_m$ is not equal to the selected value (e.g., 0), then process 900 decrements 932 $I_m$, e.g., $I_m$=$I_m$−p*$I_{m0}$, where (0<p<1). Further, process 900 increments i, e.g., i=i+1, and processing continues to step 906.

However, if $I_m$ is equal to the selected value (e.g., 0), then process 900 maintains 934 the value of $I_m$ and processing continues to step 920.

Returning to FIG. 5, based on tuning one or more intervals, process 500 updates 550 the interval tuning matrix based on the tuned intervals. The update may be performed each time an interval is adjusted, at selected times, etc. In one or more aspects, process 500 provides 560 the updated interval matrix for use in shutting down the system.

Figure 10:
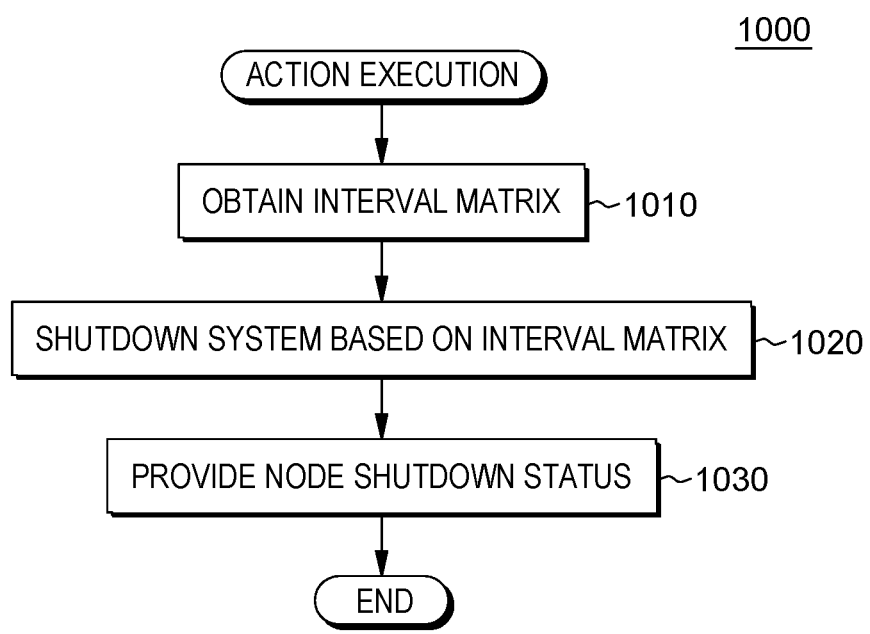
FIG. 10 depicts one example of an action execution process, in accordance with one or more aspects of the present invention.

One example of performing shut down is described with reference to FIG. 10. In one example, an action execution process (e.g., an action execution process 1000) is implemented using one or more of the sub-modules (e.g., sub-modules 260, 270-280) and is executed by one or more computing device(s) (e.g., computer(s) (e.g., computer(s) 101, other computer(s), etc.), server(s) (e.g., server(s) 104, other server(s), etc.), processor(s), node(s) and/or processing circuitry, etc. (e.g., of processor set 110 or other processor sets), and/or one or more other computing devices, etc.). Although example computers, servers, processors, nodes, processing circuitry and/or computing devices are provided, additional, fewer and/or other computers, servers, processors, nodes, processing circuitry, and/or other computing devices may be used for the shutdown process and/or other processing. Various options are possible.

In one example, action execution process 1000 (also referred to as process 1000) obtains 1010 an interval matrix, such as interval matrix 350, and uses the obtained interval matrix to shut down 1020 the system. For instance, the system components are shut down based on the interval values in the interval matrix, as further described below. Based on the shutdown, process 1000 provides 1030 node shutdown status for use in iteratively tuning the node intervals.

Further details relating to shutting down the nodes are described below. In one example:

Calculate interval of all non-leaf nodes IN.
For N(i,i),
If all its child nodes are −1, it turns out N is to be shut down after all child nodes completely shut down. Set N (i, i)=−1.
If all its child nodes are 0, it turns out N can shut down at the same time as child nodes. Set N (i, i)=0.
If any child node is not −1 or 0, N (i, i) is to be $$\max_{a \in \{c_n\}} I_{aN}.$$

In one or more aspects, based on the above, a shutdown start timeline is generated for the nodes according to the updated interval matrix, as shown in FIG. 11. In one example, as shown in FIG. 11, a shutdown start time 1110 is provided based on a dependency tree 1100 and the values of an interval matrix determined in accordance with one or more aspects of the present invention.

As described herein, a capability is provided to iteratively tune shutdown intervals of system components to be shutdown, such that the shutdown process is facilitated, reducing shutdown time, and therefore, restart time. In accordance with one or more aspects, system shutdown time is reduced, manual intervention is minimized and forced shutdowns are minimized. By reducing system shutdown, system restart is optimized, reducing the time it takes to restart the system. This minimizes workload conflicts. For instance, sequences for shutdown/restart are provided that improve workflow.

In one or more aspects, an initialization sub-module (including preparation and initialization) is provided that defines a structure for each node and finds the leaf nodes of a dependency tree as a start point to shut down for each path within the dependency tree. Each structure includes, for instance, information of shutdown interval time, the relationship in the dependency tree and each path derived from the dependency tree. Further, in one or more aspects, an iteration sub-module is provided that iterates from the leaf nodes to the root node for each path to find the minimum interval time between, for instance, each parent/child link (or other node pair) according to the shutdown effect between nodes; and a shutdown module that shuts down the system according to the determined shutdown interval time, in which during each shutdown, when a forced shutdown occurs, the interval determination module updates the interval by, e.g., decreasing a step size.

In one or more aspects, start intervals between nodes (e.g., parent/child nodes and/or other pairs of nodes) may also be adjusted similarly. In one example, the nodes may be started together and nodes waiting for their parent nodes may be started when their start time is met. Other examples are possible.

In one or more aspects, artificial intelligence may be used to continuously learn about the system and provide input to one or more of the processes herein. It may provide training (e.g., a training model) to the processes/computing devices and that training may be iteratively performed to provide enhanced data, knowledge, etc. of when to perform shutdown/restart. Many possibilities exist.

One or more aspects of the present invention are tied to computer technology and facilitate processing within a computer, improving performance thereof. For instance, processing within a computing environment is improved by providing a capability to iteratively tune shutdown intervals to reduce the amount of time to perform shutdown of a system, and thus, restart of the system. Processing within a processor, computer system and/or computing environment is improved by reducing the amount of time to perform shutdown of a system, and thus, improve restart of the system.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of systems/components may be shutdown/restarted. Further, different techniques to determine shutdown intervals may be used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      determining shutdown intervals between nodes of a dependency tree, the dependency tree representing a system to be shut down and the nodes representing system components of the system, the dependency tree including a plurality of node levels, and wherein the determining the shutdown intervals includes:
         calculating, for a pair of nodes of the dependency tree, a shutdown interval between the pair of nodes, the calculating being based on a relationship between the pair of nodes; and
         repeating the calculating for a plurality of pairs of nodes of the dependency tree to obtain a plurality of shutdown intervals; and
      using the plurality of shutdown intervals in a shutdown of the system components, wherein at least one system component represented by at least one node on a higher node level of the dependency tree, relative to another level of the dependency tree that is a lower node level of the dependency tree, is to be shut down prior to at least one other system component represented by at least one other node on the lower node level of the dependency tree.

2. The computer program product of claim 1, wherein the method further comprises iteratively tuning the plurality of shutdown intervals.

3. The computer program product of claim 2, wherein the dependency tree includes a plurality of paths, wherein a path of the plurality of paths is from a leaf node of the dependency tree to a root node of the dependency tree, and wherein the iteratively tuning is performed for each path of the plurality of paths from the leaf node to the root node.

4. The computer program product of claim 2, wherein the iteratively tuning is based, at least, on previous shutdown status of, at least, one or more system components of the system components.

5. The computer program product of claim 1, wherein the method further comprises:
   obtaining status indicating that a forced shutdown occurred for one or more system components of the system components; and
   adjusting one or more shutdown intervals of the plurality of shutdown intervals based on the status indicating the forced shutdown.

6. The computer program product of claim 5, wherein the adjusting the one or more shutdown intervals includes for a shutdown interval of the one or more shutdown intervals decreasing a step size of the shutdown interval.

7. The computer program product of claim 1, wherein the shutdown interval between the pair of nodes is initialized to one value indicating that there is no direct relationship between the pair of nodes, another value indicating to a parent node of the pair of nodes to wait for a child node of the pair of nodes to end shut down, and a further value indicating shutdown is to be performed as one or more child nodes of a parent node of the pair of nodes starts to shut down.

8. The computer program product of claim 1, wherein the shutdown of the system components is to be performed on a path basis of a plurality of paths of the dependency tree, and wherein a path of the plurality of paths is from a leaf node of the dependency tree to a root node of the dependency tree.

9. The computer program product of claim 1, wherein at least one pair of nodes comprises a parent node and a child node, and the relationship is a dependency relationship.

10. The computer program product of claim 1, wherein the system is an operating system, and the system components include at least one of an access technique, a database system, an application, and a workload.

11. A computer system for facilitating processing within a computing environment, the computer system comprising:
    a memory; and
    one or more computing devices in communication with the memory, wherein the computer system is configured to perform a method, said method comprising:
       determining shutdown intervals between nodes of a dependency tree, the dependency tree representing a system to be shut down and the nodes representing system components of the system, the dependency tree including a plurality of node levels, and wherein the determining the shutdown intervals includes:
          calculating, for a pair of nodes of the dependency tree, a shutdown interval between the pair of nodes, the calculating being based on a relationship between the pair of nodes; and repeating the calculating for a plurality of pairs of nodes of the dependency tree to obtain a plurality of shutdown intervals; and using the plurality of shutdown intervals in a shutdown of the system components, wherein at least one system component represented by at least one node on a higher node level of the dependency tree, relative to another level of the dependency tree that is a lower node level of the dependency tree, is to be shut down prior to at least one other system component represented by at least one other node on the lower node level of the dependency tree.

12. The computer system of claim 11, wherein the method further comprises iteratively tuning the plurality of shutdown intervals.

13. The computer system of claim 12, wherein the dependency tree includes a plurality of paths, wherein a path of the plurality of paths is from a leaf node of the dependency tree to a root node of the dependency tree, and wherein the iteratively tuning is performed for each path of the plurality of paths from the leaf node to the root node.

14. The computer system of claim 12, wherein the iteratively tuning is based, at least, on previous shutdown status of, at least, one or more system components of the system components.

15. The computer system of claim 11, wherein the method further comprises:
obtaining status indicating that a forced shutdown occurred for one or more system components of the system components; and
adjusting one or more shutdown intervals of the plurality of shutdown intervals based on the status indicating the forced shutdown.

16. A computer-implemented method of facilitating processing within a computing environment, the computer-implemented method comprising:
determining shutdown intervals between nodes of a dependency tree, the dependency tree representing a system to be shut down and the nodes representing system components of the system, the dependency tree including a plurality of node levels, and wherein the determining the shutdown intervals includes:
calculating, for a pair of nodes of the dependency tree, a shutdown interval between the pair of nodes, the calculating being based on a relationship between the pair of nodes; and
repeating the calculating for a plurality of pairs of nodes of the dependency tree to obtain a plurality of shutdown intervals; and
using the plurality of shutdown intervals in a shutdown of the system components, wherein at least one system component represented by at least one node on a higher node level of the dependency tree, relative to another level of the dependency tree that is a lower node level of the dependency tree, is to be shut down prior to at least one other system component represented by at least one other node on the lower node level of the dependency tree.

17. The computer-implemented method of claim 16, further comprising iteratively tuning the plurality of shutdown intervals.

18. The computer-implemented method of claim 17, wherein the dependency tree includes a plurality of paths, wherein a path of the plurality of paths is from a leaf node of the dependency tree to a root node of the dependency tree, and wherein the iteratively tuning is performed for each path of the plurality of paths from the leaf node to the root node.

19. The computer-implemented method of claim 17, wherein the iteratively tuning is based, at least, on previous shutdown status of, at least, one or more system components of the system components.

20. The computer-implemented method of claim 16, further comprising:
obtaining status indicating that a forced shutdown occurred for one or more system components of the system components; and
adjusting one or more shutdown intervals of the plurality of shutdown intervals based on the status indicating the forced shutdown.

* * * * *